United States Patent [19]

Poehler et al.

[11] Patent Number: 5,637,421
[45] Date of Patent: Jun. 10, 1997

[54] COMPLETELY POLYMERIC CHARGE STORAGE DEVICE AND METHOD FOR PRODUCING SAME

[75] Inventors: Theodore O. Poehler, Baltimore, Md.; Brendan M. Coffey, Fairport, N.Y.; Robert R. Oberle, Clinton, Conn.; Jeffrey G. Killian; Peter C. Searson, both of Baltimore, Md.

[73] Assignee: The Johns Hopkins University, Baltimore, Md.

[21] Appl. No.: 527,598

[22] Filed: Sep. 13, 1995

[51] Int. Cl.$^6$ ............................................. H01M 10/40
[52] U.S. Cl. ......................... 429/190; 429/192; 429/213; 29/623.5; 205/58
[58] Field of Search ..................................... 429/190, 192, 429/213, 245; 427/113; 205/58; 29/623.5

[56] References Cited

U.S. PATENT DOCUMENTS

| | | | |
|---|---|---|---|
| 4,442,187 | 4/1984 | MacDiarmid et al. | 429/213 |
| 4,749,451 | 6/1988 | Naarmann | 205/58 |
| 4,869,979 | 9/1989 | Ohtani et al. | 429/213 X |
| 4,960,655 | 10/1990 | Hope et al. | 429/245 X |
| 5,089,359 | 2/1992 | Ohsawa et al. | 429/213 X |
| 5,460,903 | 10/1995 | St. Aubyn-Hubbard et al. | 429/190 |
| 5,470,677 | 11/1995 | Williams et al. | 429/192 X |

*Primary Examiner*—Stephen Kalafut
*Attorney, Agent, or Firm*—Cushman Darby & Cushman IP Group of Pillsbury Madison & Sutro, L.L.P.

[57] ABSTRACT

This invention provides a method for producing a quasi-solid state charge storage device capable of being repeatedly charged and discharged, having one or more electrochemical cells with a structure capable of being stacked or combined to form primary or secondary battery devices, each cell composed entirely of an ionically conducting gel polymer electrolyte layer separating opposing surfaces of electronically conducting conjugated polymeric anode and cathode electrodes supported on lightweight porous substrates; a method of forming conjugated polymers into large area composite electrode structures with practical levels of charge storage capacity; and a quasi-solid state charge storage device produced by the above methods.

21 Claims, 7 Drawing Sheets

(a) Discharging

COMPLETELY POLYMERIC CHARGE STORAGE DEVICE AND METHOD FOR PRODUCING SAME

BACKGROUND OF THE INVENTION

1. Field of the Invention

This invention relates to the fabrication of a quasi-solid state charge storage device capable of being repeatedly charged and discharged to yield high capacities. The storage device has one or more electrochemical cells comprised entirely of a layer of ionically conducting polymer gel electrolyte separating opposing surfaces of doped or dopable electronically conducting conjugated polymeric anode and cathode electrodes supported on lightweight porous substrates. The invention further relates to the method for producing the above charge storage devices and the method of forming electrode structures like the above of such shape, density and weight so as to be suitable for combining to form battery or capacitor devices with high reversibility, prolonged stability, and high room temperature conductivity.

2. Description of the Prior Art

Polymers with conjugated π-electron backbones represent a class of polymers which can be oxidized or reduced more easily and more reversibly than conventional polymers. Charge-transfer agents referred to as dopants can favorably effect oxidation or reduction to produce conjugated polymers with conductivities approaching those acquired with metals.

Problems associated with the utilization of conducting polymers in charge storage devices include retention of processability at high conductivity levels and environmental stability. However, the advantages associated with conducting polymers, such as light weight, processability and electronic conductivity, compared to traditional metallurgical processing, suggest their potential for exploitation in commercial applications, particularly rechargeable batteries.

For successful application in batteries, optimization of cycle life and shelf life is a concern. Cycle life refers to the number of cycles of charge/discharge the battery can sustain without significant loss in performance, and is limited by factors including electrolyte degradation and polymer degradation. Shelf life refers to the retention of charge during storage over an extended period, and is limited by electrolyte impurities which can be reversibly oxidized or reduced at the polymer electrodes resulting in self-discharge of the battery. General aspects of electrically conductive polymers are discussed in further detail in Frommer, J. E. and Chance, R. R., Electrically Conductive Polymers, 5 Encycl. of Polmer Sci. and Eng'g, pgs. 462–507 (2d ed. 1986), incorporated herein by reference.

Electrical conductivity in a polymer was disclosed for polyacetylene and electrochemical doping procedures for conjugated polymers described in U.S. Pat. Nos. 4,222,903; 4,204,216; 4,321,114; 4,442,187; 4,728,589; 4,801,512; and 4,940,640 to MacDiarmid et al., incorporated herein by reference.

Other known examples of conducting polymers include polypyrrole, polythiophene and polyaniline. These conducting polymers exhibit multiple redox states so that charge can be reversibly injected and extracted from the conducting polymer. Electronic conductivity, coupled with the ability to store charge along the polymer backbone, suggests the use of conjugated polymers in charge storage devices.

Electrochemical procedures are also known which enable conjugated polymers to be electrochemically doped to a controlled degree with a wide selection of organic and inorganic ionic dopant species to either a p-type or n-type material exhibiting electrical conductivity ranging to that characteristic of metallic behavior.

Known procedures for electrochemical doping of conjugated polymers typically involve an electrochemical cell, wherein at least one of the two electrodes includes a dopable conjugated polymer as the electroactive material, and an electrolyte comprising a compound which is ionizable into one or more ionic dopant species.

P-type doping proceeds by a mechanism in which operation of the electrochemical cell effects an increase in the oxidation state of the polymer by electron transfer from the carbon atoms on the conjugatedly unsaturated polymer backbone chain, imparting a positive charge thereto and consequently attracting the dopant anions as counter ions to maintain electrical neutrality in the polymer.

N-type doping proceeds by a mechanism in which operation of the electrochemical cell effects a decrease in the oxidation state of the polymer by electron transfer to the carbon atoms on the conjugatedly unsaturated polymer backbone chain, imparting a negative charge thereto and consequently attracting the dopant cations as counter ions to maintain electrical neutrality in the polymer.

The polymer in each case becomes doped to a degree dependent upon the change effected in the oxidation state of the polymer and the dopant species concentration in the electrolyte.

Secondary batteries based on known conducting polymers, in various electrode configurations and charge states, making up one or both of the anode and cathode electrodes, and in combination with a metal material or alone, are described in the patents referenced above, as well as in U.S. Pat. Nos. 4,537,195 to Weddigen; 4,869,979 to Ohtani et al.; 4,401,545 and 4,535,039 to Naarmann et al.; 4,544,615 to Shishikura et al.; 4,804,594 to Jow et al.; 4,832,869 to Cotts; and 4,837,096 to Kimura et al., each incorporated herein by reference.

For example, a secondary battery is known which in its charged state includes a n-type cation-doped conjugated polymer as its anode-active material, and a p-type anion-doped conjugated polymer as its cathode-active material.

The discharging mechanism of the above secondary battery involves the simultaneous electrochemical undoping of the cation-doped conjugated polymer and of the anion-doped conjugated polymer, with their respective ionic dopant species being retrievably released from each of the polymers into the electrolyte system.

The charging mechanism of the above secondary battery involves the simultaneous electrochemical doping of one of the electroactive conjugated polymers (i.e., the anode-active polymer of the charged battery) with the cationic dopant species from the electrolyte, and of the other electroactive conjugated polymer (i.e., the cathode-active polymer of the charged battery) with the anionic dopant species from the electrolyte.

Practical application of conjugated polymers in commercial batteries requires the resolution of some critical development issues. For example, efficient methods are needed to process conjugated polymers into electrode structures. These methods must compensate for the limited mechanical strength associated with conjugated polymers as well as their inability to be formed by melt processing methods. Furthermore, since the rate of charge insertion and extraction in a particular conjugated polymer is dependent upon the diffusion of counterions in and out of the conjugated polymer, methods to fabricate electrodes should be amendable to thin film, high surface area construction.

In the prior art, it is known to form conjugated polymer electrodes by electropolymerization of films onto planar metal substrates. However, the inclusion of the metal substrate into an electrochemical cell reduces the effective specific energy of the cell and increases the overall weight of the cell. Also in the prior art, polymeric electrodes have been formed by pelletization of low molecular weight powders resulting from chemical polymerization. However, the electrochemical properties of these known powders are significantly less favorable than for electropolymerized films.

The use of ionically conducting polymeric electrolyte compositions in electrochemical cells is also known in the prior art, and is described in U.S. Pat. No. 4,808,496 to Hope et al. and Gray, F. M., "Solid Polymer Electrolytes," VCH, New York (1991), each incorporated herein by reference.

Hope et al. '496 describes a typical solid polymeric electrolyte composition formed by compounding a salt and a polymeric material such as polyethylene oxide. Alternatively, a solvent can be combined with the polymer to improve its film-forming properties, and with the electrolyte salt to improve diffusion into the polymer in solution.

Solid polymer electrolytes are suitable for processing into large area thin layer films and can also function as a separating layer between anode and cathode electrodes. Leakage of electrolyte from the cell is also prevented by the use of solid polymer electrolytes. Polymers containing either covalently bound ionic groups or unshared electron pairs on heteroatoms which solvate and disassociate ionic salts are known for use as the polymeric component.

Transport of ions in polymer electrolytes is coupled to relaxation of the polymer chain, with ion transport occurring only in the amorphous regions of the polymer. At room temperature, the ion-containing polymer may be extensively crystalline, with low chain mobility and concomitant reduction in conductivity. Plasticizers have been used to enhance chain mobility and increase rates of ion transport.

More recently, gel polymer electrolytes have been developed, which are two phase (solid/liquid) systems with ion conduction through the liquid phase, leading to high room temperature conductivity in the range of about $1 \times 10^{-3}$ $ohm^{-1}$ $cm^{-1}$ (S/cm). Methods for forming various gel polymer electrolytes, composed of lithium salt-solvates of organic solvents in a polymer component, including, for example, polyacrylonitrile (PAN), poly(tetraethylene glycol diacrylate) (PEGDA), poly(vinyl pyrrolidone) (PVP), poly (vinylidene fluoride) (PVF), and poly(vinyl chloride) (PVC), are described in Watanabe et al., "Ionic Conductivity of Hybrid Films Composed of Polyacrylonitrile, Ethylene Carbonate, and $LiClO_4$, " J. Polym. Sci. 21:939 (1983); Alamgir, M. and Abraham, K. M., "Li-Conductive Solid Polymer Electrolytes with Liquid-Like Conductivity," J. Electrochem. Soc. 137:1657 (1990); and Alamgir, M. and Abraham, K. M., "Li Ion Conductive Electrolytes Based on Poly(Vinyl Chloride)," J. Electrochem. Soc. 140:L96 (1993), each incorporated herein by reference.

Presently, the above-described polymer electrolytes have been developed predominantly for lithium battery systems with lithium metal serving as the electroactive anode material, due to the fact that many lithium salts have low lattice energies needed for dissociation in polymeric solvents. However, the use of polymer electrolytes in lithium battery systems require stability in contact with the highly reactive metal, as well as ideal lithium ion transport numbers near unity. These same electrolytes might be used in cells with conjugated polymer electrodes, without the same constraints.

SUMMARY OF THE INVENTION

It is, accordingly, an object of the present invention to provide a novel method for processing conjugated polymeric electrodes and incorporating them with a gel polymer electrolyte to form an entirely polymeric quasi-solid state charge storage device, that is lightweight, stable, exhibits high reversibility, and maintains high room temperature conductivity in relation to the prior art.

A further object of the invention is to provide a method for processing a pseudo n dopable conjugated polymeric anode electrode for incorporation in an entirely polymeric cell with a conjugated polymeric cathode electrode, in order to increase the cell open circuit potential and thereby increase the specific energy capacity of the cell over that expected for a cell with an undoped conjugated polymer anode.

Another object of the present invention, in accordance with the preceding objects, is to provide a method of forming conjugated polymers into composite polymer electrode structures, with practical levels of charge storage capacity. This method would be suitable for any conjugated polymer capable of being electropolymerized onto a porous substrate.

In accordance with the preceding objects, the invention also provides a method of forming large area planar conjugated polymer/substrate electrode structures that are porous and lightweight and that may be stacked and combined to form batteries.

Also in accordance with the preceding objects, the invention provides for electrochemical cells and batteries with electroactive polymer electrodes and gel polymer electrolytes processed by means of solution casting.

The above objects and more are accomplished by incorporating a gel polymer electrolyte, with an effective layer thickness and conductivity, between opposing surfaces of dopable conjugated polymeric anode and cathode electrodes, each supported on a porous substrate, with an effective geometry and area, to form a reversible electrochemical cell suitable for a charge storage device.

One or more of the electrochemical polymer cells formed by the above methods can be arranged to form battery devices with practical levels of charge storage capacity, and room temperature conductivity suitable for commercial

DETAILED DESCRIPTION OF THE INVENTION

Figure 1:
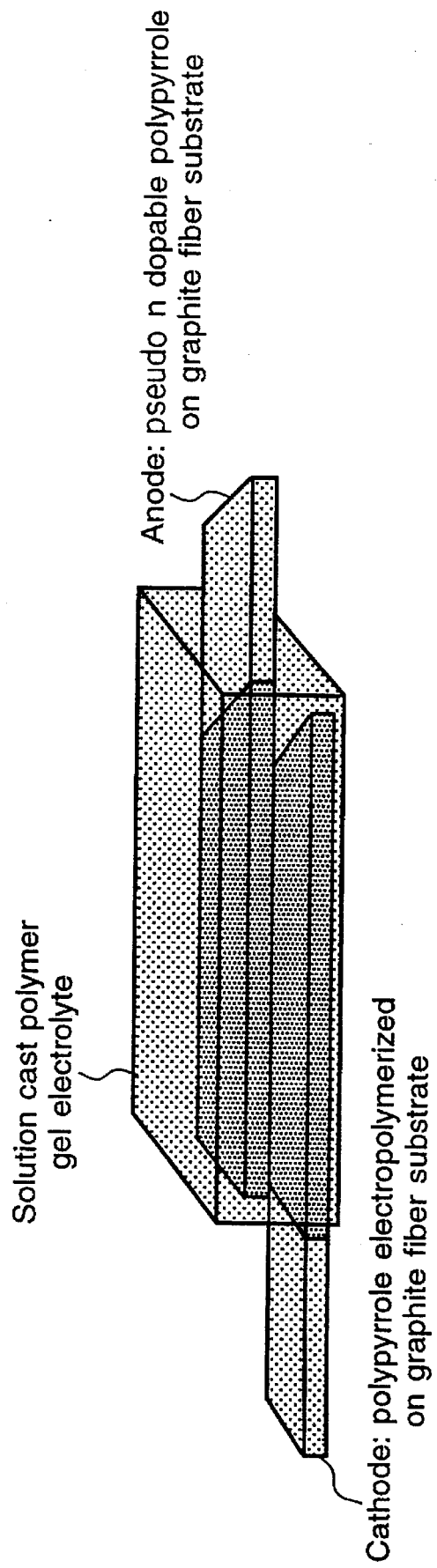
FIG. 1 depicts the polymeric cell of the present invention obtained in Example I.

A method for forming a quasi-solid state reversible charge storage device, comprising at least one electrochemical cell having a layer of an ionically conducting gel polymer electrolyte separating opposing surfaces of electronically conducting conjugated polymer anode and cathode electrodes supported on porous fiber substrates, is described.

A porous substrate of an electrically conducting, mechanically strong and chemically stable material provides support for the electroactive conjugated polymers forming the composite anode and cathode electrode structures of the electrochemical cell. In general, any supporting porous substrate of suitable geometry, thickness and area can be chosen. The substrate should have the following properties: good electrical conductivity; good chemical stability; good mechanical stability; and high surface area. The dimensions chosen for the substrate should allow for the electro-polymerization conditions to be controlled in order to optimize the charge and energy storage capacity of the conjugated polymer, as well as that of the overall composite electrode structure.

Preferably, an interconnected network of graphite fibers in the form of a thin sheet serves as the substrate and is utilized as the conductive support for the cathode and anode structures. Graphite fiber substrates are commercially available in thicknesses ranging from about 90–350 µm and areas of greater than 0.25 m$^2$ pec sram . The preferred area and thickness chosen is dependent upon the desired capacity of the cell.

A conjugated polymer is used as the polymer material for each of the composite electrode structures. The monomer of the desired conjugated polymer is used as the starting material, and may be electropolymerized onto the substrate. In general, any conjugated polymer which is dopable with an ionic dopant species to a more highly electrically conducting state is suitable. Conjugated polymers which are suitable for this purpose and known in the art, include; polyacetylene, polypyrrole, polythiophene, polyaniline, and the like. All of these polymers are characterized by having conjugated unsaturation along their main backbone chain. Acceptable variations of the above polymers and others can be made in a given material by chemically changing the bond configuration or adding other substituent groups.

The conjugated polymer is dopable by electrochemical doping procedures known in the art, whereby p-type doping of the conjugated polymer as the cathode active material is effected with anionic dopant species, while n-type doping of the polymer as the anode active material is effected with cationic dopant species. A wide variety of anionic and cationic dopant species may suitably be employed, either individually or in combination, for effectively modifying the room temperature electrical conductivity of the conjugated polymers.

Suitable anionic dopant species for effecting p-type doping include, for example, $I^-$, $Br^-$, $Cl^-$, $F^-$, $ClO_4^-$, $PF_6^-$, $AsF_6^-$, $SO_3CF_3^-$, $BF_4^-$, $BCl_4^-$, $NO_3^-$, $POF_4^-$, $CN^-$, $SiF_5^-$, $CH_3CO_2$ (acetate), $C_6H_5CO_2^-$ (benzoate), $CH_3C_6H_4SO_3^-$ (tosylate), $SiF_6^-$, $SO_4^{--}$, and the like.

Suitable cationic dopant species for effecting n-type doping include, for example, all of the alkali metals, all of the alkaline earth metals, and certain metals from Group 3 (Y, Sc and Al) and Group 4 (Zr and Ti) of the Periodic Table.

A monomer of the desired conjugated polymer may be polymerized by electropolymerization or chemical polymerization. Alternatively, the polymer film may be deposited by solution casting a solution containing the dissolved polymer. Electropolymerization may be performed by controlling the electrode potential or current to obtain the desired polymer film thickness, morphology, mass per unit area and the resulting charge capacity. The electrode potential should be kept more positive than the polymerization potential in order for deposition of the monomer onto the substrate to occur.

In a preferred embodiment, pyrrole is used as the starting material for the composite structure of the cathode electrode, and a polypyrrole film is electropolymerized onto a graphite substrate by applying a voltage for a suitable time to a molar concentration of pyrrole and salt in a solvent solution.

The molar concentration of monomer in solution can range from about 0.1M to about 1M, preferably 0.16M. The salt in solution is chosen from a combination of the above examples of suitable cationic and anionic species; preferably $LiClO_4$ is used. The concentration of salt in solution can range from about 0.1M to 1.0M, preferably 0.75M. Suitable solvents for the solution include known organic solvents, e.g., acetonitrile, water and propylene carbonate, and mixed solvents of water and another organic solvent. In general, the electropolymerization conditions used to form the polymer cathode electrode should be chosen to specifically optimize the desired characteristics of the cathode.

Figure 2:
FIG. 2 depicts polypyrrole film electrode posited onto a graphite fiber substrate conductive support.

For example, FIG. 2 shows an a polypyrrole film formed on a graphite fiber substrate. The film was formed by polymerization at 0.7V (SCE) for 75 minutes from a solution containing 0.16M pyrrole, 0.75M $LiClO_4$ in distilled water and acetonitrile (1:1 by volume). The rough surface of the film, in conjunction with the overall porous structure of the composite electrode give a high surface area and good charge release characteristics for the insertion and extraction of counterions.

Figure 3:
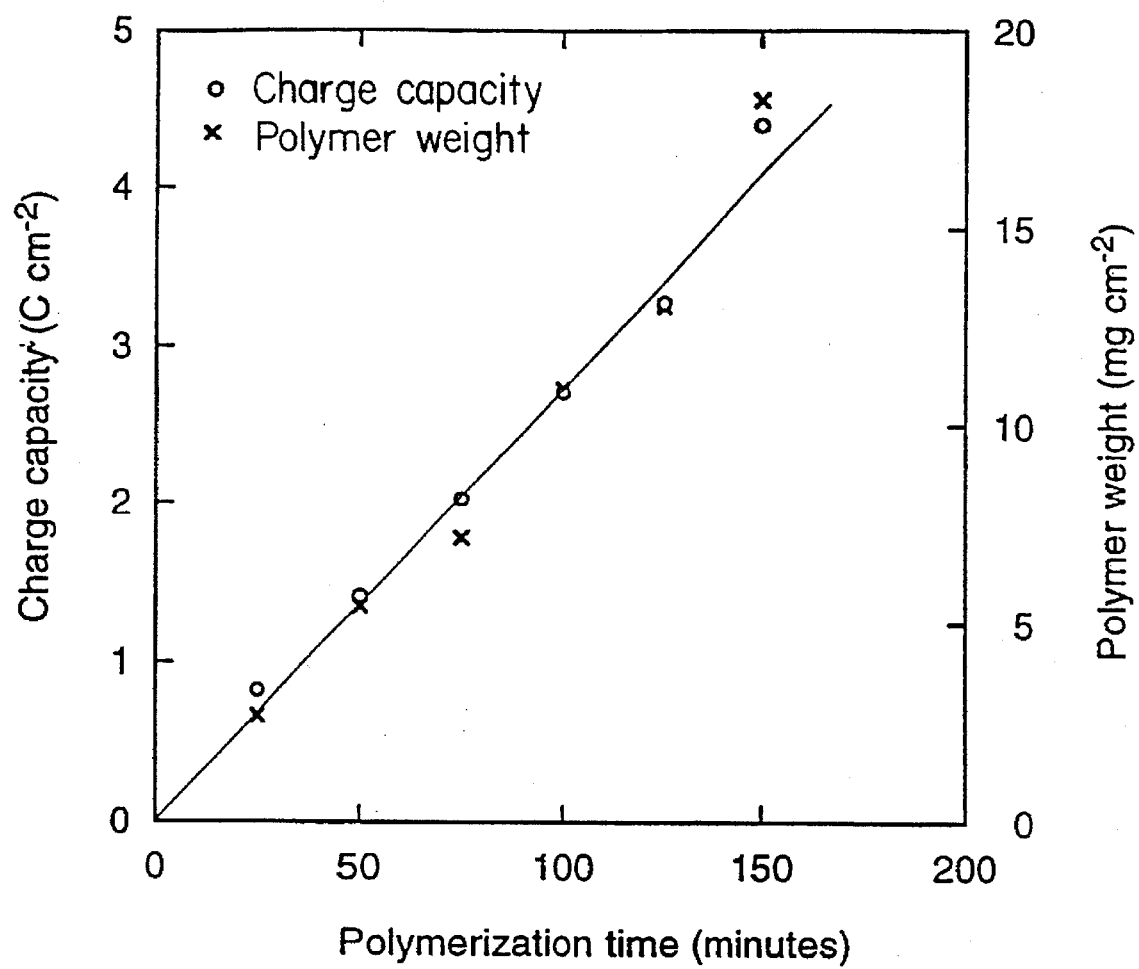
FIG. 3 depicts the linear increase in electrode charge capacity and corresponding increase in mass of polypyrrole deposited per unit area of substrate as a function of polymerization time.

Practical levels of charge capacity per unit mass and area can be obtained. FIG. 3 shows the linear relationship between the mass of polypyrrole deposited per unit area of substrate as the polymerization charge density is increased with longer polymerization times. Specific charge capacities of polypyrrole films produced under the above conditions range from about 90–100 mAh g$^{-1}$, based on the electroactive mass of the polymer. Even when the mass of the graphite substrate is included, a charge capacity of the entire composite electrode structure greater than 70 mAh g$^{-1}$ can be obtained for a film electropolymerized for 150 minutes with an available charge density of 4.4C cm$^{-2}$ for a 90 µm thick graphite fiber substrate.

In general, n-type conducting polymers are known to be unstable and not particularly durable for use as a polymeric anode material, and therefore a metal electrode (e.g., Li) is often used as the anode.

In particular, when using polypyrrole as the polymer for the anode electrode, it should be understood that polypyrrole does not possess an n-doped state which would be most suitable for use as a polymer anode. However, a pseudo n dopable form may be obtained by electropolymerization of pyrrole in the presence of a polyanion (PA). The polyanion should be chosen so that the size of the polypyrrole/PA molecule is large enough that the polyanion does not dissociate into the electrolyte. Suitable polyanions or large anions include, e.g., polystyrenesulfonate and polyvinylsulfate; preferably polystyrenesulfonate is used.

The polymer anode can be electropolymerized from a solution consisting of solvent, dissolved monomer, and dopant polyanion chosen from the above examples and under the above-described conditions. In the preferred embodiment of the anode structure, a film is polymerized onto a graphite substrate from a solution of solvent, dissolved polystyrenesulfonate and pyrrole under conditions described above. With the use of a pseudo n dopable anode structure, an increase from about 1 to 1.3 volts in the cell open circuit potential can be obtained.

An optional electrolytic drying procedure can be used to remove absorbed water from the polymerized anode and cathode electrode structures prior to incorporating the gel polymer electrolyte. It is speculated that the electroactivity of the composite conjugated polymer electrode structures may be enhanced by removal of the solvated water in the polymer. A suitable method for electrolytic drying of the electrode structures is described in Osaka, T. et al. "Electroactivity Change of Electropolymerized Polypyrrole/ Polystyrenesulfonate Composite Film in Some Organic Electrolytes," Chem. Lett. 9:1787–90 (1992), incorporated herein by reference.

In a preferred embodiment, following electropolymerization, the electrode structures are rinsed with dry acetonitrile and transferred to a dry DMF/ acetonitrile solution. Electrolytic breakdown of water is carried out for a minimum of about 24 hours at a reducing potential of about −1.3V versus a silver/silver perchlorate reference electrode.

Generally, other solvent solutions may be suitable for use in the electrolytic drying procedure. The electrode potential chosen should be sufficiently negative to reduce the water electrolytically. Removal of water increases the open circuit stability of the charged states of the structures, as well as increasing the potential range over which the electrolyte is stable.

The ionically conducting electrolyte of the cell is a formulated gel polymer electrolyte which gives desirable processing and physical characteristics. The gelation mixture is incorporated as a layer in a liquid state between opposing surfaces of the polymerized anode and cathode electrode structures to form the cell, with subsequent gelation to a solid state over a period of several days as the volatile liquid component of the electrolyte mixture evaporates. Application of the electrolyte in a liquid state allows penetration into the porous cathode and anode electrode structures, providing intimate contact with the surfaces of the electrodes.

The composition of the gel polymer electrolyte includes a polymer component, a salt, and an organic solvent or combination of organic solvents. The polymer component provides stability to the electrolyte, while the permittivity of the organic solvents enable extensive dissociation of the salt.

Suitable polymer components include polyacrylonitrile (PAN), poly(tetraethylene glycol diacrylate) (PEGDA), poly (vinyl pyrrolidone) (PVP), poly(vinylidene fluoride) (PVF), poly(vinyl chloride) (PVC), and the like. Suitable organic solvents include acetonitrile, ethylene carbonate (EC), propylene carbonate (PC), and the like, or a combination thereof. Examples of suitable salts include those that dissociate into the anionic and cationic species listed above.

In general, the concentration (in weight %) of the polymer component in the electrolyte composition can range from about 3% to about 15%; the concentration of the salt in the composition can range from about 2% to about 14%; and the concentration of the organic solvent in the composition can range from about 71% to about 95%. Preferably, the weight percent proportion of polymer component:salt:organic solvent(s) is 6.2:4.4:89.4.

In a preferred embodiment of the gel polymer electrolyte; the polymer component is polyacrylonitrile (PAN), the organic solvent is a combination of acetonitrile, ethylene carbonate and propylene carbonate, and the salt is $LiClO_4$.

Figure 5:
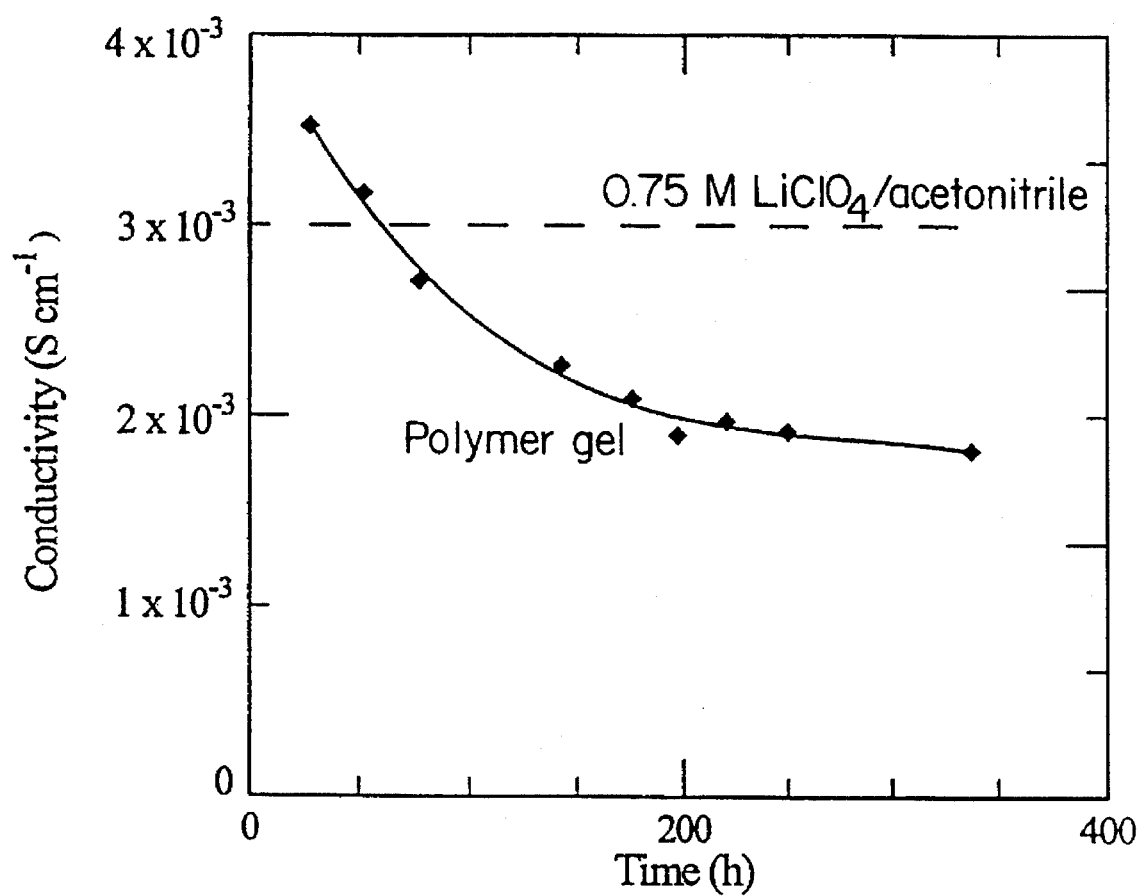
FIG. 5 depicts the ionic conductivity as a function of gelation time of the gel polymer electrolyte formulated in Example I.

The components of the electrolyte composition are mixed to a homogenous liquid solution. FIG. 5 depicts the ionic conductivity of the gel polymer electrolyte measured as a function of gelation time. The conductivity of the electrolyte decreases from 2.5 to $1.5 \times 10^{-3}$ S cm$^{-1}$, as it changes from a liquid to a gel state with evaporation of the volatile liquid component, and stabilizes at about $1.5 \times 10^{-3}$ S cm$^{-1}$. Further loss of liquid, other than the volatile component, is slow or negligible and the resultant gel is stable for periods of several months.

One method of incorporating the gel polymer electrolyte as a layer between opposing surfaces of the electrode structures, is to apply the liquid gelation mixture to fill an intervening space created between the electrodes held apart by an insulating spacer of known thickness, typically on the order of about 250 µm.

The preferred method of incorporation is by spin or dip coating (solution casting) the composite electrode structures into the liquid gelation mixture to form a thin film on the outer surface of the structure, on the order of about 1–10 µm thickness. Single or multiple coats of the gel electrolyte can be applied in this manner, with an intermediate period for gelation to control the total thickness of the electrolyte layer. The total thickness of the layer generally ranges from about 10 to about 250 µm, preferably the layer thickness is less than about 100 µm.

The anode and cathode electrode structures coated with the gel polymer electrolyte are then placed essentially parallel and joined with a bonding layer of the gel mixture, the bonding layer also being allowed to gel.

The above thin film methods of incorporating a layer of gel polymer electrolyte between opposing surfaces of the anode and cathode structures have the advantage of decreasing the total mass of the cell as well as electronic and mass transfer resistances between the electrodes, thereby increasing the specific energy and power capacity of the device.

The gel polymer electrolyte provides for high room temperature conductivity and allows a practical method for thin film cell construction. A continuous gel coating or casting process may also be suitable as a means to commercially manufacture the cells of the present invention.

Alternative gel polymer formulations within the scope of the present invention and solid polymer electrolytes might also be employed to enhance the performance of these cells.

Cells constructed according to the method of the present invention described above have been found to exhibit 1–3 mAh capacity. It is contemplated that the capacity of these cells may be increased by the simple expedient of increasing the area of the electrode structure (substrate) and/or the electropolymerized mass per unit area.

The resultant polymer cells can be arranged in any suitable number or fashion to produce lightweight battery devices, which exhibit high room temperature conductivity, and high reversibility over extended cycling. Suitable arrangements include combining the cells in series or in parallel. In a preferred embodiment of the present invention, a planar geometry, of the substrate and resulting composite electrode structures and cell, allows for a stacking arrangement of the cells, which is particularly useful in terms of conserving space and increasing the voltage of the battery.

While the charge storage device of the present method has been described in terms of its reversible capability of operating both in the discharge mode and in the charge mode as a secondary device, it may also be employed, if desired, as a primary device operating in the discharge mode alone.

The specific cell chemistry described in the following Example I is further illustrative of the present invention, but is not deemed limited thereto. It is also noted that the method described below can be applied with different electrode and electrolyte material chemistries, and with various modifications derived from the foregoing disclosure, in order to further optimize the capacity of the device within the scope of the invention.

EXAMPLE I

Two 350 μm thick TGP-120 porous graphite fiber substrates were used as conductive supports for each of the composite conjugated polymer electrode structures. A conjugated polymer film was deposited onto a surface of each of the graphite substrates by electropolymerization under the conditions described below. The planar geometry of the substrates was especially suited to stacking the formed cells into batteries. The area of each electrode was 14 $cm^2$.

Pyrrole was chosen for the electroactive cathode starting material. When charged the polypyrrole in the cathode is in the fully oxidized p-doped state. Composite cathodes were fabricated by electropolymerization from a 0.75M $LiClO_4$, 0.16M pyrrole solution in acetonitrile (1% vol. water added) held at 0.7V (SCE) until a total electrodeposition charge density of 18C $cm^{-2}$ had been passed. This corresponded to a film thickness on the graphite substrate of approximately 4.5 μm.

Pyrrole was also chosen for the electroactive anode starting material. The conditions for the formation of the composite anodes were as follows: a solvent mixture of distilled water/acetonitrile (3:1 by volume) was used to dissolve 0.26N polystyrenesulfonate (60,000 MW $Na^+$ form) and 0.16M pyrrole. Polymerization was carried out at 0.7V (SCE) until a net oxidation charge of 36C $cm^{-2}$ was padded. This corresponded to a film thickness on the graphite substrate of approximately 11.5 μm.

Figure 4:
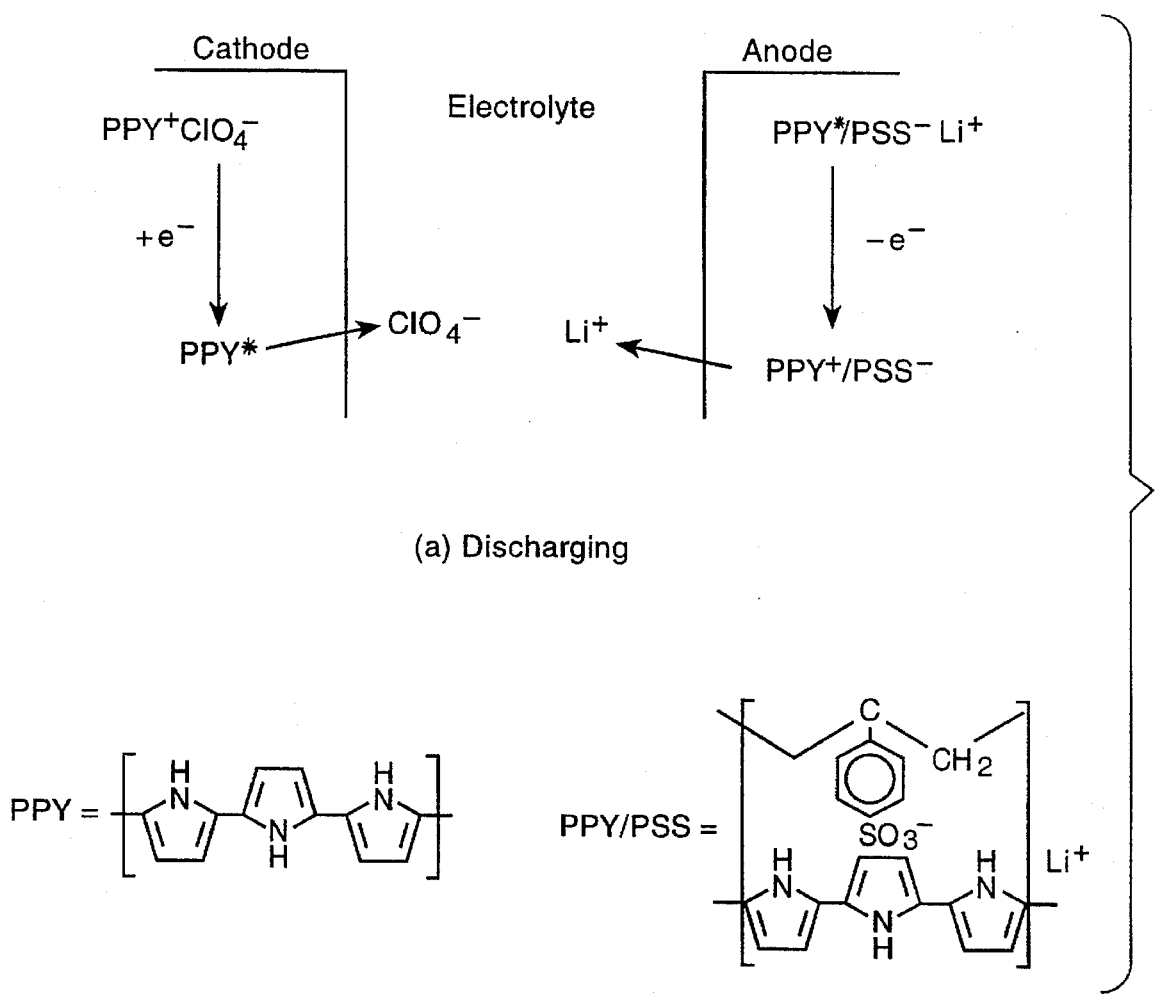
FIG. 4 depicts the chemical structure and electrochemical discharge reaction of the polymeric cell comprising the polypyrrole (cathode) electrode and polypyrrole/polystyrene sulfonate (anode) electrode obtained in Example I.

FIG. 4 depicts the chemical structure and discharge reaction for the polypyrrole (cathode) electrode and pseudo n dopable polypyrrole/polystyrenesulfonate (anode) electrode.

The available charge capacity of the anode and cathode electrode structures prepared was 0.74 and 1.25C $cm^{-2}$, respectively. The pseudo n dopable anode structure enabled an increase from 1 to 1.3 volts in the cell open circuit potential, however, the charge storage capacity of the anode material was less efficient than that of the cathode material, and the cells prepared were therefore anode limited. The characteristics of the prepared composite anode and cathode electrode structures are presented in Table 1:

TABLE 1

Standard Characteristics of Composite Polypyrrole Anodes and Cathodes

| Composition: | CATHODE Polypyrrole | ANODE Polypyrrole/ polystyrenesulfonate |
|---|---|---|
| Deposition charge (C $cm^{-2}$): | 17.86 | 35.71 |
| Polymer film thickness on graphite fibers (μm) | 4.5 | 11.5 |
| Polymer mass per unit deposition charge (mg $C^{-1}$) | 0.376 | 0.617 |

TABLE 1-continued

Standard Characteristics of Composite Polypyrrole Anodes and Cathodes

| Composition: | CATHODE Polypyrrole | ANODE Polypyrrole/ polystyrenesulfonate |
|---|---|---|
| Available charge capacity (C $cm^{-2}$) | 1.25 | 0.74 |
| Specific charge capacity (mAh $g^{-1}$) | 52 | 9.3 |

An electrolytic drying procedure was used to remove absorbed water from the polymerized electrodes prior to incorporating the gel polymer electrolyte. Following electropolymerization, the electrode structures were rinsed with dry acetonitrile and transferred to a dry DMF/acetonitrile (1:1 by volume) solution. Electrolytic breakdown of water was carried out for a minimum of 24 hours at a reducing potential of −1.3V versus a silver/silver perchlorate reference electrode (0.02M $AgClO_4$ in acetonitrile).

A gel polymer electrolyte was formulated, and the gel mixture in a liquid state was incorporated as a layer between opposing surfaces of the anode and cathode electrode structures, with subsequent gelation to a solid occurring over a period of several days as the volatile liquid component (acetonitrile) of the mixture evaporated.

The composition of the gel polymer electrolyte was as follows:

| Component | Weight % | Mole % |
|---|---|---|
| Ethylene carbonate | 44.1 | 38.9 |
| $LiClO_4$ | 4.4 | 3.2 |
| Polyacrylonitrile | 6.2 | 2.0 |
| Propylene carbonate | 26.2 | 20.0 |
| Acetonitrile | 19.0 | 36.0 |

The components of the mixture were stirred and refluxed over an oil bath at 80° C. until the mixture was a homogenous liquid solution. FIG. 5 depicts the ionic conductivity of the gel polymer electrolyte as a function of gelation time. The conductivity of the electrolyte decreases from 2 5 to $15 \times 10^{-3}$ S $cm^{-1}$, as it changes from a liquid to a gel state with the evaporation of acetonitrile, and stabilizes at $1.5 \times 10^{-3}$ S $cm^{-1}$. Further loss of liquid (propylene carbonate) was slow or negligible and the gel was stable for periods of several months.

The gel polymer electrolyte was incorporated as a layer by spin or dip coating (solution casting) the composite electrode structures into the liquid gelation mixture to form a thin film on the outer surface of the structures, on the order of 1–10 μm thick. Single or multiple coats of the gel polymer electrolyte were applied in this manner, with an intermediate period for gelation between each application to control the total thickness of the electrolyte layer. The two gel coated electrode structures were then placed parallel and joined with a bonding layer of the gel mixture, the bonding layer also being allowed to gel. FIG. 1 depicts the constructed solution cast thin film quasi-solid state entirely polymeric cell.

Figure 6:
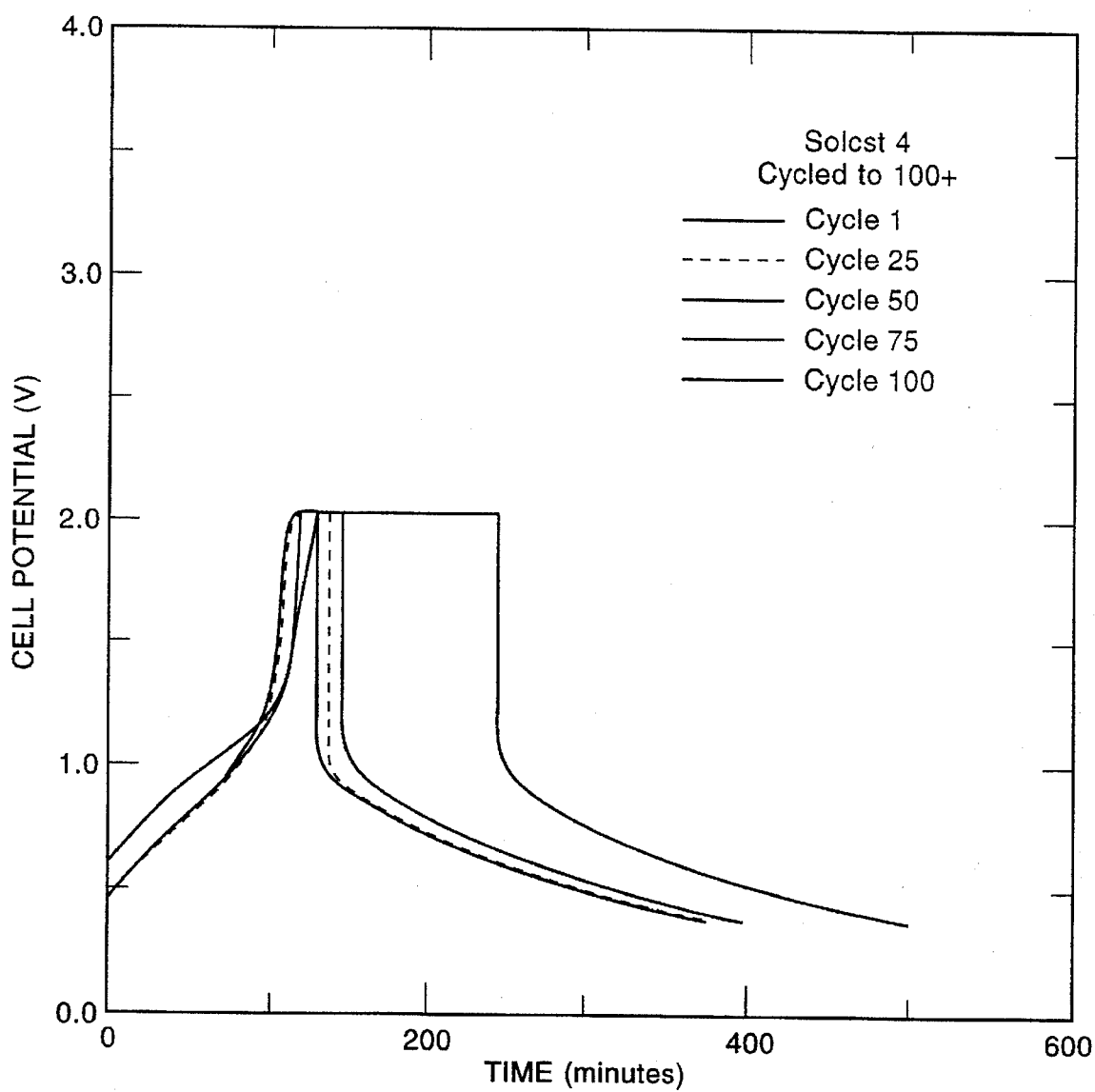
FIG. 6 depicts the cycling (charging/discharging) performance for the polypyrrole-polypyrrole/polyanion cell with gel polymer electrolyte obtained in Example I.
Figure 7:
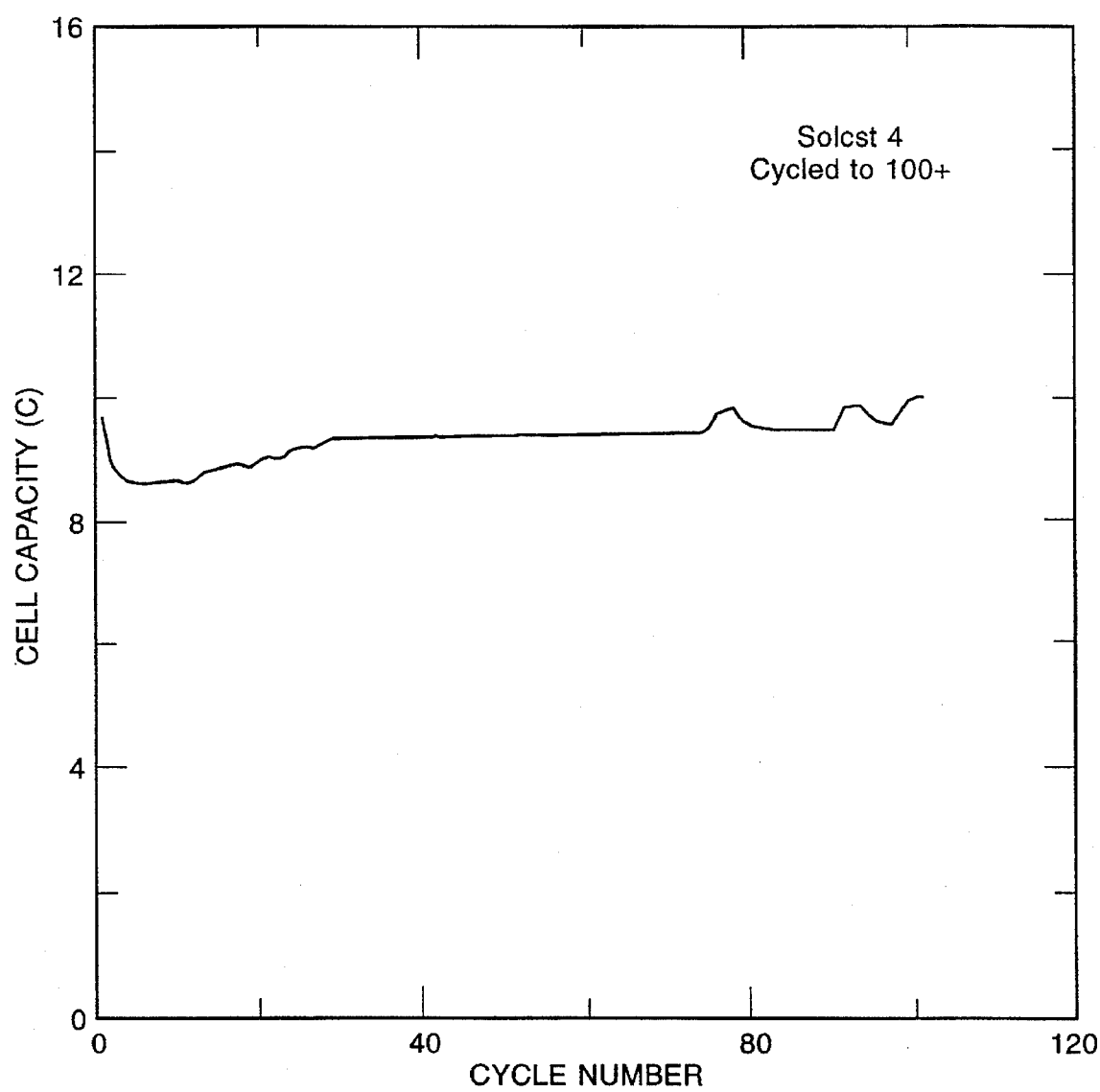
FIG. 7 depicts the discharge capacity over the course of 100 cycles for the polypyrrole-polypyrrole/polyanion cell with gel polymer electrolyte obtained in Example I.

Cycling performance of the polypyrrole-polypyrrole/polystyrenesulfonate cell over a 1 kΩ passive load is depicted in FIG. 6. The total capacity of the device was measured to be approximately 8C, giving a specific capacity of 20 mAh g$^{-1}$ and 10 J g$^{-1}$, based on the electroactive mass of the polypyrrole cathode. The constructed polymer cell also exhibited very reversible cell performance. FIG. 7 depicts the discharge capacity of the cell over 100 charge/discharge cycles.

What we claim is:

1. A method for producing a quasi-solid state reversible charge storage device having one or more electrochemical cells, comprising the steps of:

(a) forming a composite anode structure by depositing an electronically conducting conjugated polymer onto a area porous substrate;

(b) forming a composite cathode structure by depositing an electronically conducting conjugated polymer onto a porous substrate;

(c) formulating an ionically conducting polymer gel electrolyte comprising a polymer component, a salt, and an organic solvent or solvent mixture, and having a room temperature conductivity in excess of $1 \times 10^{-3}$ S/cm;

(d) incorporating a layer of said electrolyte in a liquid state between opposing surfaces of said composite anode and said composite cathode structures; and (e) combining said anode, said cathode, and said electrolyte together to form one or more cells of the charge storage device.

2. A method for producing a charge storage device according to claim 1, further comprising the step of electrolytically drying said composite anode and cathode electrode structures before incorporating said electrolyte layer.

3. A method for producing a charge storage device according to claim 1, wherein said conjugated polymer of said anode electrode structure forming step is polypyrrole doped with an organic polyanion, and said conjugated polymer of said cathode electrode structure forming step is polypyrrole.

4. A method for producing a charge storage device according to claim 3, wherein said organic polyanion is polystyrenesulfonate.

5. A method for producing a charge storage device according to claim 3, wherein said first and second porous substrates of said anode and cathode structure forming steps is a graphite material.

6. A method for producing a charge storage device according to claim 5, wherein the geometry of said first and second porous graphite substrates is planar.

7. A method for producing a charge storage device according to claim 1, wherein the polymer component of said gel polymer electrolyte is polyacrylonitrile, the salt is LiClO$_4$ and the solvent mixture is ethylene carbonate, propylene carbonate and acetonitrile.

8. A method for producing a charge storage device according to claim 7, wherein the layer thickness of said gel polymer electrolyte is about 10 to about 250 μm and the conductivity of said gel polymer electrolyte is at least about $10^{-3}$ S cm$^{-1}$.

9. A method for producing a charge storage device according to claim 1, wherein said gel polymer electrolyte is incorporated between the surfaces of the cathode and anode electrode structures by solution casting.

10. A method for producing a charge storage device according to claim 1, wherein said combining step further comprises arranging more than one cell serially or in parallel to form a battery.

11. A charge storage device made according to the method of claim 1.

12. A method of forming a composite polymer electrode structure of an electrochemical cell with an effective charge storage capacity, comprising the step of electropolymerizing a layer thickness of a conjugated polymer onto a surface of a planar graphite substrate with an effective area, said layer thickness and said area being such as to produce said effective charge capacity.

13. A quasi-solid state reversible charge storage device comprising:

at least one electrochemical cell;

a composite anode electrode structure, said anode structure having an electronically conducting conjugated polymer formed on a first porous substrate with an effective geometry and area for storing a charge on said anode structure;

a composite cathode electrode structure, said cathode structure having an electronically conducting conjugated polymer formed on a second porous substrate with an effective geometry and area for storing a charge on said cathode structure;

an ionically conducting gel polymer electrolyte layer comprising a polymer component, a salt and an organic solvent or solvent mixture, and having an effective layer thickness and room temperature conductivity, said electrolyte layer interposed in a liquid state between opposing surfaces of said composite anode and cathode electrode structures; and said anode electrode structure, said cathode electrode structure and said gel polymer electrolyte layer together forming said at least one electrochemical cell.

14. A charge storage device according to claim 13, wherein said first and second porous substrates are a graphite material.

15. A charge storage device according to claim 13, wherein the geometry of said first and second porous substrates is planar.

16. A charge storage device according to claim 14, wherein said conjugated polymer of said anode structure is polypyrrole doped with an organic polyanion, and said conjugated polymer of said cathode structure is polypyrrole.

17. A charge storage device according to claim 16, wherein said organic polyanion is polystyrenesulfonate.

18. A charge storage device according to claim 13, wherein the polymer component of said gel polymer electrolyte layer is polyacrylonitrile, the salt is LiClO$_4$, and the solvent mixture is ethylene carbonate, propylene carbonate and acetonitrile.

19. A charge storage device according to claim 18, wherein the layer thickness of said electrolyte is about 10 to about 250 μm and the conductivity of said electrolyte layer is at least about $10^{-3}$ S cm$^{-1}$.

20. A charge storage device according to claim 13, wherein said one or more cells has a charge capacity of at least about 20 mAh g$^{-1}$ and 10 J g$^{-1}$.

21. A charge storage device according to claim 13, further comprising a number of said cells arranged serially or in parallel to form a secondary battery.

* * * * *

UNITED STATES PATENT AND TRADEMARK OFFICE
CERTIFICATE OF CORRECTION

PATENT NO. : 5,637,421
DATED : June 10, 1997
INVENTOR(S) : Poehler, et al.

It is certified that error appears in the above-identified patent and that said Letters Patent is hereby corrected as shown below:

At column 1, line 4, insert:

The work that resulted in the subject invention was supported by Grant No. N00039-95-C-0002, with the United States Department of the Navy as the sponsoring government agency.--

Signed and Sealed this

Twenty-third Day of June, 1998

Attest:

BRUCE LEHMAN

Attesting Officer

Commissioner of Patents and Trademarks